United States Patent [19]

Halpern et al.

[11] Patent Number: 5,037,677

[45] Date of Patent: * Aug. 6, 1991

[54] METHOD OF INTERLAMINAR GRAFTING OF COATINGS

[76] Inventors: Gregory Halpern, Wilson Park Dr., Tarrytown, N.Y. 10591; Charles Campbell, Highwood Pl., Alpine, N.J. 07620; Ellington M. Beavers, 931 Coates Rd., Meadowbrook, Penn. 19046; Huk Y. Chen, 42-01 Auburndale Ln., Flushing, N.Y. 11358

[*] Notice: The portion of the term of this patent subsequent to Jan. 31, 2006 has been disclaimed.

[21] Appl. No.: 436,924

[22] Filed: Nov. 7, 1989

Related U.S. Application Data

[63] Continuation of Ser. No. 034,451, Apr. 6, 1987, which is a continuation-in-part of Ser. No. 643,598, Aug. 23, 1984, Pat. No. 4,801,475.

[51] Int. Cl.$^5$ .................... B05D 3/04; B05D 3/12; B32B 7/12; A61K 37/12
[52] U.S. Cl. ........................... 427/338; 427/2; 427/340; 427/399; 427/407.1; 427/407.2; 530/356
[58] Field of Search ............ 427/2, 399, 338, 340, 427/407.1, 407.2; 530/356

[56] References Cited

U.S. PATENT DOCUMENTS

| | | | |
|---|---|---|---|
| 4,280,954 | 7/1981 | Tannis et al. | 530/356 |
| 4,487,865 | 12/1984 | Balazs et al. | 525/54.4 |
| 4,500,676 | 2/1985 | Balazs et al. | 525/54.4 |

OTHER PUBLICATIONS

Astra Meditec AG: PCT/SE83/00191: WO83/03977-'-'Articles Exhibiting a Biocompatible Surface Layer and Process for Providing Articles with Such a Surface Layer".

Primary Examiner—John Kight, III
Assistant Examiner—P. Hampton-Hightower
Attorney, Agent, or Firm—William H. Eilberg

[57] ABSTRACT

Interlaminar grafting of coatings, particularly grafting of a lubricious outer coating upon an anchor coating supported upon glass or plastic, for example, to provide anti-fogging or lubricating characteristics. The method is characterized by its ability to anchor permanently the highly lubricious coating to the glass or plastic.

8 Claims, No Drawings

5,037,677

METHOD OF INTERLAMINAR GRAFTING OF COATINGS

CROSS REFERENCES TO RELATED APPLICATIONS

This is a continuation of copending application(s) Ser. No. 07/034,451 filed on Apr. 6, 1987, now abandoned which in turn was a continuation-in-part of Ser. No. 643,598, filed Aug. 23, 1984, and issued as U.S. Pat. No. 4,801,475, Jan. 31, 1989.

BACKGROUND OF THE INVENTION (1) Field of the Invention

Coatings, particularly interlaminar grafting of coatings to each other to achieve a synergistic permanence and lubricity of coating.

DESCRIPTION OF THE PRIOR ART

LAMBERT et al.: U.S. Pat. No. 4,459,317
GALIN: U.S. Pat. No. 4,240,163

There have been unsuccessful attempts by others to achieve the same results as those afforded by applicants' method of interlaminar grafting. However, bi-component grafting of coatings has not been suggested and there has been no teaching of ensuring permanence of the coating. Lambert U.S. Pat. No. 4,459,317, for example, prepared a cured, crosslinked coating by reacting hydrophilic materials such as polyethylene oxide with polyisocyanates. The coating so produced is not an interlaminar graft, and the coating shows very poor adhesion to the surface of most materials of interest, such as polymethyl methacrylate or glass. Particularly after soaking the coated object in aqueous media, the coating spontaneously lifts or is brushed off easily.

Galin U.S. Pat. No. 4,240,163 disclosed the transient coating of intra-ocular lenses with a sulfated polysaccharide such as heparin or sulfated hyaluronic acid to serve as a medicament to reduce blood clotting and inflammation in surgical lens placement. Galin's coatings are soluble in aqueous body fluids and indeed were intended to be, so that the medicament could be effective in the area of the surgical operation. No laminating is carried out in Galin's invention, nor does he cause any grafting or permanence of the coating to be accomplished.

Applicants respectfully submit that no conceivable teaching from either of these references, independently or in combination, nor from any other prior art, suggests the uniquely effective process of interlaminar grafting of coatings according to the present invention.

SUMMARY OF THE INVENTION

Method of interlaminar grafting of coatings upon an object, such as plastic, for example, comprising first coating the object with an anchor coating of a solution containing an acrylic polymer and a solvent and second coating the object with an aqueous solution containing sodium hyaluronate, then heating the first coating and second coating so as to effect interlaminar grafting between coatings. As a result of such interlaminar grafting, a highly lubricious coating may be permanently anchored to an object, such as plastic.

DESCRIPTION OF PREFERRED EMBODIMENTS

The present invention concerns a method which applicants have termed "interlaminar grafting" of materials that cannot be mixed with each other, either because of hostile physical states, mutual incompatibility, and/or mutual insolubility. Applicants submit that this process for the first time enables preparation of permanent and uniformly durable lubricious coatings for a wide variety of substances. These durable lubricious coatings impart surface characteristics that may be markedly different from those of the uncoated surface, thereby enhancing the value of those coatings for uses in which they did not previously qualify.

BACKGROUND OF THE INVENTION

When two miscible substances of conventional molecular weight and potentially capable of chemical reaction are mixed together, the two kinds of molecules are in kinetic motion characteristic of the temperature. The energy level associated with any given molecule reflects the energy imparted to it in the many chance collisions with other molecules in the medium. As such collisions of any given pair of molecules occur, the probability that chemical reaction will ensue depends, inter alia, upon whether those particular molecules had acquired the necessary activation energy: in most cases, reaction does not ensue from a given collision.

When one of the reactants is of high molecular weight, as in the case of a high polymer, for example, the situation is different. The polymeric molecule will normally contain one or more reactive groups in each repeating unit along the chain, and these are inhibited in acquiring energy through collisions by the very fact that their motion is restricted by their attachment at each end to the rest of the large molecule. In an oversimplified illustration, one might say that the polymer segment is capable of kinetic vibration in two dimensions only, whereas the simple molecule can vibrate in three dimensions. The probability of a collision occurring that has the potential for reaction is consequently reduced in the case of high polymers.

When both molecules containing groups capable of chemical reaction are high polymers, both species show inhibited ability of individual reactive segments to move about in space, and the probability of reaction occurring is even lower.

In interlaminar grafting reactions, applicants consider the case in which two or more polymers are deposited in film or coating form, one superimposed upon the other. After each coating is deposited, the solvent or other vehicle is then removed. When this has been accomplished, neither reacting species in the thusly formed laminate is capable of any significant movement in any direction, relative to the other, except for the restricted kinetic vibration in two dimensions of chain segments. In this situation, the probability of intermolecular reactions occurring is very low indeed.

But there is a further restriction of that interaction in most real-life cases. Thus, if it were desirable to react an acrylic polymer with a derivative of polystyrene, the first recourse one might take would be to mix organic-solvent solutions of the two polymers. The immediate consequence would be precipitation of a sticky, opaque, insoluble curd of no conceivable use. Experienced chemists are well aware of the general principle, to which exceptions are rare, that high polymers of different kinds are immiscible and incompatible with each other.

An even more extreme case of this intolerance of one polymer for another is that of an acrylic polymer, soluble in organic solvents such as toluene, and sodium hyaluronate, soluble only in water. One polymer is hydrophobic and insoluble in water; the other is hydrophilic and insoluble in organic solvents. The likelihood of the two polymers ever coming into intimate enough contact to allow chemical reactions to occur between the species is manifestly so unlikely as to be disregarded.

Thus, it is a surprising and unexpected result of the present invention that interlaminar reactions of such species can indeed be induced to produce very useful and valuable products. Examples are given below, together with convincing evidence for surprising effects of interlaminar grafting.

DESCRIPTION OF THE INVENTION

In most cases, the purpose of interlaminar grafting according to the present invention will be to effect a substantial change—even a dramatic change—in the surface characteristics of a material. Glass, for example, has desirable properties as a glazing material, except that when so used in transportation vehicles, it can lose its transparency by condensation of moisture upon the hydrophobic surface in contact with a humid atmosphere. When a hydrophilic surface is uniformly applied to the glass, fogging in humid atmospheres will not occur. By means of interlaminar grafting, according to the present invention, a highly lubricious coating of sodium hyaluronate may be permanently grafted with an acrylic under coating, so as to eliminate fogging.

As another example, cytotoxic sodium hyaluronate is used as a lubricant in surgical replacement of a clouded lens with a synthetic intra-ocular lens (IOL), in the hope of reducing damage to endothelial tissues. However, the sodium hyaluronate must then be flushed out quickly and thoroughly to mitigate damage that can be done by the lubricant itself. By interlaminar grafting of sodium hyaluronate onto a suitably coated IOL, the toxic effect is eliminated and the lubrication is permanently achieved.

In carrying out interlaminar grafting according to the present invention, a primary consideration is the nature of the surface to be changed. The first polymer film to be applied to the surface must be chosen so as to establish and maintain high specific adhesion under the conditions of anticipated use, and the first polymer must contain a plurality of functional groups with the potential for reacting with functional groups in the second polymer to be applied. This chosen first polymer is applied to the surface to be changed by any conventional means that is suitable, such as spraying a solvent solution or aqueous dispersion of the polymer or, for example, by roller coating a solution. The article is then heated or otherwise treated to remove any solvents or dispersing agents and to fuse particulate materials if necessary so as to form a continuous film.

The second polymer is chosen to display the surface characteristics desired in the final product, and to contain functional groups that have the potential for reacting chemically with those in the primary polymer. The second polymer is applied on top of the first polymer, again by any suitable conventional procedure, and the article again is treated to remove solvents or dispersants and to fuse particulates if necessary. Even though the two polymers may be highly incompatible when attempts are made to mix them, the bi-component laminates just described show no evidence of this. If each film in its free state would be clear and transparent, the laminate is clear and transparent, and the interface is not apparent to the eye.

The laminated structure is now heated, irradiated, or otherwise treated to conditions that will cause the polymers to co-react and to be chemically grafted to each other. These conditions will vary in kind with the nature of the functional groups, and the most effective intensity and duration of the grafting treatment may need to be found by experiment.

In the final product, the laminate has been firmly and permanently affixed, and the properties of the new surface faithfully reflect those of the second or top film as intended.

It is almost axiomatic to say that the individual surfaces must be kept scrupulously free of foreign substances such as fingerprints, dust, etc., which would tend to shield from each other the functional groups capable of undergoing the grafting reactions. In production scheduling, it is not always possible or convenient to apply the second lamina immediately after the first is formed, and maintenance of clean conditions is a vital consideration under these circumstances. When a cleaning operation becomes necessary as an intermediate step before proceeding with the application of the second lamina, we have found the use of plasma cleaning to be a method of choice.

By observing the considerations just outlined, one can prepare interlaminar-grafted coatings on a wide variety of materials: plastics, metals, glass, and wood.

EXAMPLES OF INTERLAMINAR GRAFTING

Example 1

To the surfaces of an acrylic intra-ocular lens was applied a first polymer solution of an acrylic copolymer of ethyl methacrylate and isocyanatoethyl methacrylate. The thusly coated lens was suspended in a vacuum oven and the solvent removed at a temperature of 50° C. and under a pressure of 60 mm of mercury. The lens was then removed from the oven and immersed in an aqueous solution of sodium hyaluronate as a second polymer surface coating. The lens was slowly withdrawn and allowed to drain for five minutes. The slight excess at the lower edge was blotted with absorbent sponge and the water in the top coat allowed to evaporate. The lens was then heated at 55° C. to effect interlaminar grafting, in which isocyanate groups in the first polymer coat reacted with hydroxyl groups in the hyaluronate. When removed from the oven and moistened with water, the surface of the lens showed the slipperiness characteristic of hyaluronates and this was not lost even by washing the lens in detergent solutions.

Example 2

A solution in ethoxyethyl acetate was prepared containing a copolymer of ethyl methacrylate, butyl acrylate, and fifteen mole-percent hydroxyethyl methacrylate. To this was added a polyisocyanate in sufficient quantity to represent 1.25 equivalents of isocyanate per hydroxyl equivalent in the acrylic copolymer. The solution was applied as a first polymer coating to the surface of a sheet of Plexiglas with a coating knife set at three mils clearance. The Plexiglas panel was placed in a vacuum oven to allow formation of a pre-polymer from the two solutes while the solvent was evaporated. After the panel was removed from the oven and allowed to cool, a solution of 0.2% sodium hyaluronate was superimposed as a second coating on the first film with a coating knife set at six mils clearance. After evaporation of the water in a stream of warm air, the panel was returned to the oven at a temperature of 65° to allow interlaminar grafting in which hydroxyl groups in the hyaluronate lamina reacted with isocyanate groups in the first lamina. The finished panel had a lubricious surface that could not be washed away. When the cold, coated panel was placed over a container of hot water, it did not fog, whereas an uncoated panel immediately fogged up on the area impinged by the warm vapors.

TESTING OF INTERLAMINAR GRAFTS

Test A

The interlaminated panel with two coatings prepared in Example 2 was sawed into strips one-half inch wide and two inches long. These were placed in a 500-ml balloon flask and covered with distilled water. The flask was attached to a condenser and the water heated to boiling. The water was refluxed at 100° C. for 24 hours and was then cooled and the coated strips removed and examined. The properties of the strips were found to be unchanged in any way: no delamination of the coating had occurred; the coating was still clear and transparent; and the coated surface was still slippery as before. The wet coated surface was wiped with a squeegee, and a drop of water then placed on the surface disappeared immediately, showing a contact angle of zero.

Test B

Laminated coatings of the types described in Examples 1 and 2 were prepared on plate glass, after which the films were shaved off the glass with razor blades. Strips of the free film, approximately 1-2 mm × 10 mm in size, were surgically implanted in the backs of New Zealand white rabbits. The animals were observed for seven days for gross signs of irritation at the implantation sites and then were sacrificed for examination. All implantation sites and all animals appeared normal from initiation to termination of the study. The pathologist's conclusion was that implantation of these films resulted in minimal to moderate tissue reaction that was generally comparable to that observed with negative control materials.

According to applicants' method of interlaminar grafting, there are required a minimum of two laminae, each of which contains the necessary chemically reactive groups capable of forming the interlaminar graft-links. These reactive groups may be either built into the polymer comprising one of the laminae, as in the case of the isocyanate group in isocyanatoethyl methacrylate in the "prime" lamina; or the isocyanate group can be introduced into the "prime" polymer by the preliminary formation of a prepolymer as in Example 2.

A very similar result could be obtained by reversing the roles of the "prime" and the "secondary" or "surface" polymers. For example, the "prime" lamina could be a copolymer of methyl methacrylate and hydroxyethyl methacrylate. The "surface" lamina could then be a polyvinyl alcohol prepolymer with a polyisocyanate, for example. The basic invention (interlaminar grafting) applies in all such cases, where two laminae containing the capacity for chemical grafting to each other are brought into face-to-face contact.

We claim:

1. Method of interlaminar grafting of continuous coatings upon an object, the coatings being different and not mutually soluble, the method comprising the steps of:
    a) first coating the object with a solution containing an acrylic polymer and a solvent;
    b) removing the solvent, so as to form a first continuous film which manifests a high degree of adhesion to the object;
    c) second coating the object with an aqueous solution of sodium hyaluronate;
    d) removing water from said second coating, so as to form a second continuous film; and
    e) heating said first and second films, so as to effect interlaminar grafting between the films, wherein both films retain their individual integrity.

2. Method of interlaminar grafting of coatings upon an object as in claim 1 wherein the object is plastic.

3. Method of interlaminar grafting of continuous coatings upon an object, the coatings being different and not mutually soluble, the method comprising the steps of:
    a) first coating the object with a solution of an acrylic co-polymer of ethylmethacrylate and isocyanatoethyl methacrylate;
    b) removing the solvent so as to form a first continuous film which manifests a high degree of adhesion to the object;
    c) second coating the object with an aqueous solution of sodium hyaluronate;
    d) removing water from said second coating so as to form a second continuous film; and
    e) heating said first and second films so as to effect interlaminar grafting in which isocyanate groups in said first film react with hydroxyl groups in said second film of hyaluronate, wherein both films retain their individual integrity.

4. Method of interlaminar grafting of coatings upon an object as in claim 3, wherein the object is an intraocular lens.

5. Method of interlaminar grafting of continuous coatings upon an object, the coatings being different and not mutually soluble, the method comprising the steps of:
    a) first coating the object with a solution in methoxypropyl acetate prepared from:
        i) a copolymer of ethyl methacrylate, butylacrylate and hydroxyethyl methacrylate, and
        ii) polyisocyanate in sufficient quantity to represent 1.25 equivalents of isocyanate per hydroxyl equivalent in said polymer;
    b) heating so as to evaporate solvent and enable formation of a prepolymer so as to form a first continuous film which manifests a high degree of adhesion to the object;
    c) second coating the object with an aqueous solution of sodium hyaluronate;
    d) removing water from the said second coating aqueous solution so as to form a second continuous film; and
    e) heating said first and second films, so as to effect interlaminar grafting such that the hydroxyl groups in said second film hyaluronate react with said first film isocyanate groups, and wherein both films retain their individual integrity.

6. Method of interlaminar grafting of coatings upon an object as in claim 5, wherein said second coating is a solution of 0.1% to 2% sodium hyaluronate.

7. Method of interlaminar grafting of coatings upon an object as in claim 5, wherein said hydroxyethyl methacrylate is 10 to 25 mole-percent.

8. Method of interlaminar grafting of coatings upon an object as in claim 5, wherein said polyisocyanate is added in sufficient quantity to represent 1.1 to 2 equivalents of isocyanate per hydroxyl equivalent in said acrylic copolymer.

* * * * *